INVENTORS
Anthony M. Putetti and
John C. McMurray
BY
Spencer, Rockwell & Bartholow
ATTORNEYS United States Patent Office 3,213,664
Patented Oct. 26, 1965

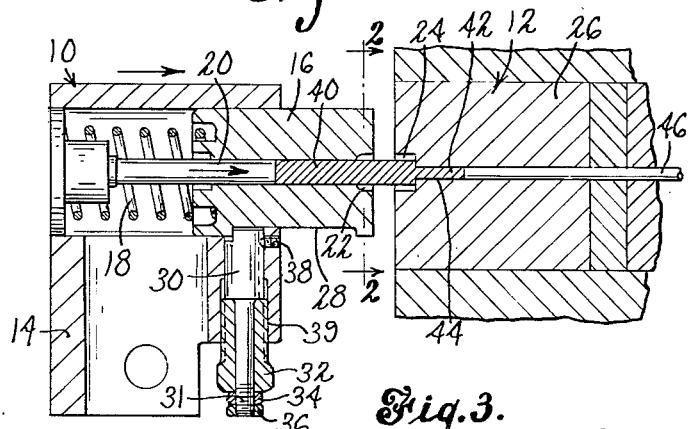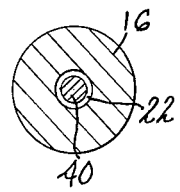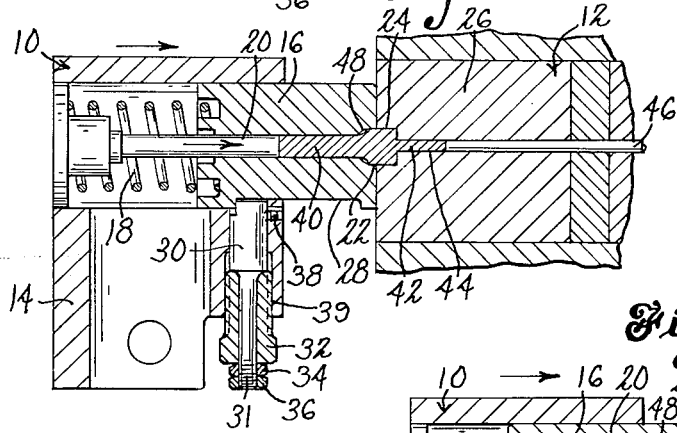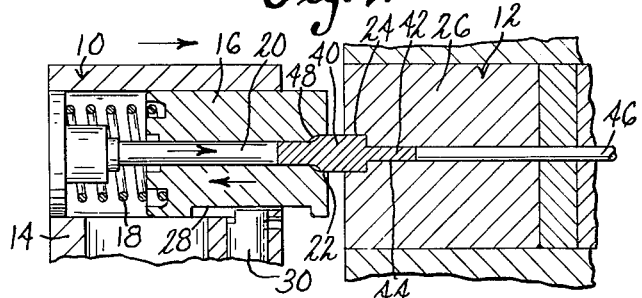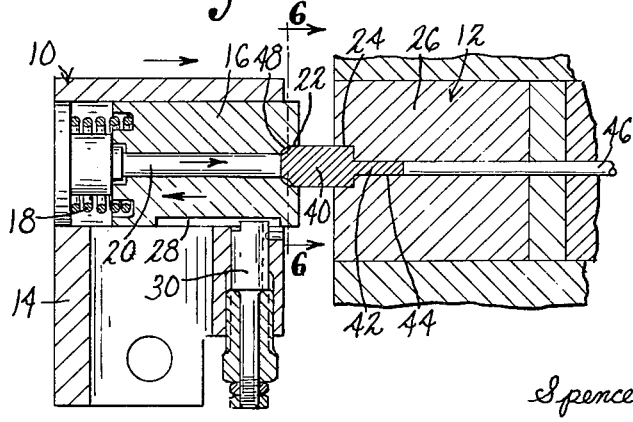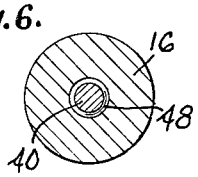

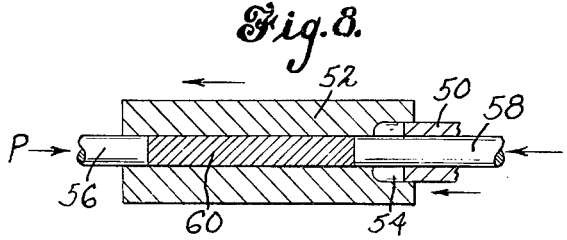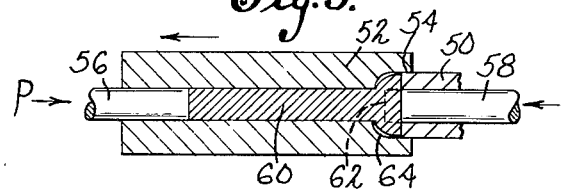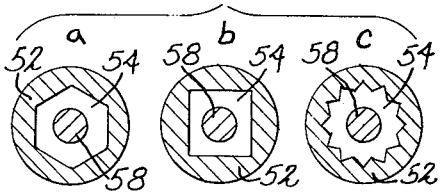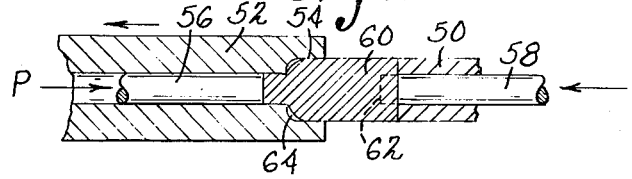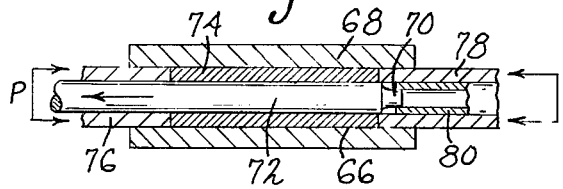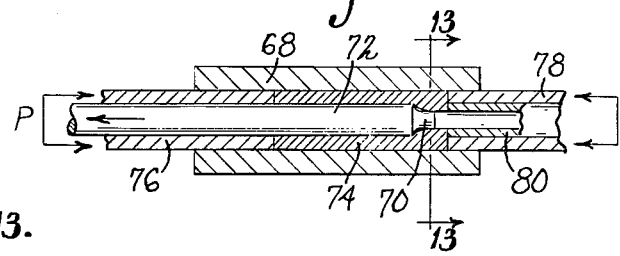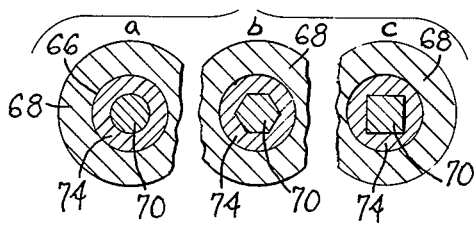

3,213,664
APPARATUS FOR FORMING ARTICLES
Anthony M. Putetti, Waterbury, and John C. McMurray, Middlebury, Conn., assignors to Textron Inc., Providence, R.I., a corporation of Rhode Island
Filed Mar. 24, 1961, Ser. No. 98,065
7 Claims. (Cl. 72—343)

This invention relates to an apparatus for working steel and other metals and more particularly to the cold working of steel.

In the prior art there are many processes and apparatus for cold working metals to produce articles having head and shank portions. Of these, the cold heading techniques presently employed are the most popular. However, since the metal is invariably confined during the heading of the blank and since the blank is subjected to substantial forces, the ratio of the unsupported length of the blank to its original diameter is limited to avoid bending the blank. This ratio has been set in practice at about two and one-half to one with the result that the shape of the articles produced by the processes and apparatus of the prior art are limited within certain narrow ranges or the process altered to include additional steps and apparatus.

Briefly, our invention relates to an apparatus in which the metal is forced to flow radially inwardly or outwardly due to compressive forces applied at both ends of the blank or workpiece. The articles produced may have a variety of exterior or interior geometric forms and may be solid or hollow. As a result of working the metal blank in accordance with the invention, the axial length of the blank is reduced and the cross sectional area is increased. As the metal blank is being worked, the punch sleeve moves axially relative to the work portion of the blank leaving the latter unsupported. The unsupported portion of the worked blank, however, is sufficiently rigid to withstand the forces continuously applied to it during the time the remainder of blank is being worked.

In view of the foregoing an object of this invention is to provide an apparatus for making articles by cold working metals, wherein the metal is allowed to expand freely.

Still another object of this invention is to provide new and useful apparatus for making articles by cold working metals, whereby the metal employed is forced to flow radially and axially.

Still a further object of this invention is to provide new and useful apparatus for making articles by cold working metals, whereby the metal blank employed is reduced in length and increased in cross-sectional area simultaneously.

Other objects of the invention will in part be obvious and will in part appear hereinafter.

The invention accordingly comprises the several steps and the relation of one or more of such steps with respect to each of the others, the apparatus embodying features of construction, combinations and arrangement of parts which are adapted to effect such steps, and the article which possesses the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the accompanying drawings, in which:

FIG. 1 is a cross-sectional view of a punch and die arrangement according to one embodiment of the invention showing the initial position of the elements;

FIG. 2 is a cross-sectional view taken along line 2—2 of FIG. 1;

FIG. 3 is a view similar to FIG. 1 showing the relationship of the elements during the initial stage of the method;

FIG. 4 is a view similar to FIG. 1, showing the relationship of the elements during a subsequent stage of the method;

FIG. 5 is a view similar to FIG. 1 showing the arrangement of the elements at the final stage of the method;

FIG. 6 is a cross-sectional view taken along line 6—6 of FIG. 5;

FIG. 7 is a view similar to FIG. 6 showing various geometric configurations of the cavity in the punch die;

FIGS. 8, 9 and 10 show a modified form of the apparatus for carrying out the method according to the invention;

FIG. 8 is a sectional view of a punch and die showing the initial position of the elements;

FIG. 9 is a view similar to FIG. 8 showing the relationship of the elements during the initial stage of the method;

FIG. 10 is a view similar to FIG. 8 showing the relationship of the elements at the final stage of the method;

FIGS. 11, 12 and 13 show another modification of the invention in which hollow articles are produced;

FIG. 11 is a sectional view of the punch and die showing the initial position of the elements;

FIG. 12 is a view similar to FIG. 11 showing the relationship of the elements during a subsequent stage of the method;

FIG. 13 is a cross-sectional view taken along lines 13—13 of FIG. 12 showing various geometric configurations of the forming member;

Figure 14:
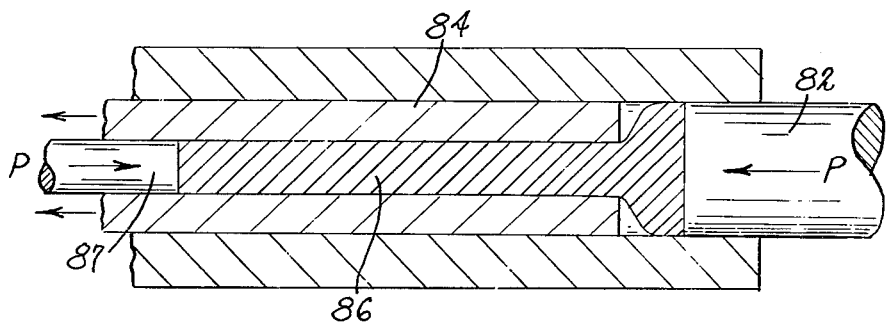
FIG. 14 is a cross-sectional view of another embodiment of the invention.

Referring now to FIGS. 1 through 6 of the drawings, the apparatus according to one embodiment of the invention comprises a punch, generally designated at 10, and a die generally designated at 12. As shown in the figures, the punch is movable and the die is held stationary. The punch and die are mounted within and actuated by suitable mechanisms (not shown) which form no part of this invention but which are well known in the art.

The punch 10 includes a punch ram 14 actuated by a gate (not shown), and a punch sleeve 16 slidably mounted within the ram and urged by resilient means such as a spring 18 toward the die 12. A heading pin 20 is slidably mounted within the sleeve 16 and is preferably fixed to the ram 14, so that the heading pin 20 and the ram 14 move in unison toward the die during the working operation. During the initial movement of the ram 14, the sleeve 16 moves toward the die a very small distance to form a closed cavity with the die 12; and the sleeve 16 is preferably provided with a round bottom cylindrical cavity 22 adjacent to and co-axial with a cavity 24 in a die block 26.

The sleeve 16 is provided with a slot 28 forming a way for a longitudinally adjustable key 30 which is provided with a threaded portion 31. The key is secured by a threaded member 32 and nuts 34 and 36 as shown. A set screw 38 prevents the key 30 from rotating and the key acts as a stop for the sleeve 16 and also prevents the latter from rotating. The member 32 threadably engages the ram as shown at 39 and the nuts 34 and 36 which threadably engage the threaded portion 31 of the key 30 hold the latter in place.

A blank or workpiece 40, preferably provided with a tenon 42 is placed in a bore of the sleeve 16 and abuts against the heading pin 20 at one end. The other end of the blank is positioned in a tenon bore 44 in the die block 26 which communicates with the cavity 24. An ejector pin 46 which is slidably mounted in the bore 44 abuts against the other end of the blank. As clearly shown in FIGS. 1 and 2 the cavity 22 and the cavity 24 are larger than the blank 40, so that the blank may expand to a larger diameter.

Referring to FIG. 3 which illustrates the initial stage of the operation, the sleeve 16 and the face of the die block 26 are brought together by movement of the ram 14 in the direction of the arrow thus forming a cavity. The heading pin 20, moving with the ram 14, forces the blank into this cavity and as the heading pin and ram continue their movement toward the die, forces are exerted on the ends of the blank which force the metal to flow into the free space of cavities 22 and 24 tending to fill the cavity except for the concave portion 48 (FIG. 6). When sufficient pressure builds up to overcome the frictional forces between the sleeve bore and blank and the force of the resilient means 18, the sleeve 16 is forced in a direction opposite to the direction of movement of the ram 14 and the pin 20. The sleeve 16 then slides relative to the worked portion of the blank which is then left in a free or unconfined state. As the punch continues its movement the unworked portion of the blank continually expands radially into the punch or sleeve cavity 22 as shown in FIG. 4. Thus, the worked portion progressively builds up until the blank has been completely worked as shown in FIG. 5, after which the ejector pin 46 in the die is actuated in any suitable manner to eject the article from the die. The article ejected from the die may be in final form or may then be subjected to finishing operations such as slotting, threading and the like.

To obtain a free standing progressively built up worked portion, it is hypothesized that the velocity ratio between the sleeve (moving in a direction opposite to the direction of the ram) and the heading pin (moving with the ram) should be proportional to the area of the unworked blank to the area of the worked blank. If the velocity ratio of the sleeve 16 and the pin 20 is greater than the ratio of the unworked blank area to the area of the worked blank, an inferior product may be produced and the apparatus is not operated at an efficient capacity. However, if this velocity ratio is less, the free standing portion of the worked blank will "balloon," that is, radially expand beyond the diameter of the punch and die cavity resulting in poor dimensional accuracy. In any event, at the correct velocity ratio the worked portion of the blank can be formed in appreciable continuous lengths with high dimensional accuracy due to the free expansion of the metal. To form an article of "infinite" length or of continuous length, column effects will have to be overcome by allowing the worked portion to recede into a suitable die cavity for support. This may be accomplished by providing a die sleeve similar to the punch sleeve arrangement with perhaps a certain length of the worked blank in an unsupported condition between the punch and die as shown in FIGS. 4 and 5.

The elongated head of the object made by the process and apparatus above described is cylindrical because the shape of the cavity in the sleeve is cylindrical. However, if the cavity is polygonal, hexagonal or some other shape as shown in FIG. 7, the outer surface of article produced will have a corresponding shape. Likewise, the die cavity may have various configurations so that the shank may have the same configuration as the head or may have a different configuration, as the case may be.

In the modification of the invention shown in FIGS. 8 through 10, the die cavity is eliminated and the die is provided with a protruding sleeve portion 50 which in the initial position of the punch and die is telescoped within the sleeve cavity of the punch.

For the purpose of illustrating the modification, shown in FIGS. 8 through 10, only the operative elements are illustrated, with the arrows indicating the movement and forces applied to the respective elements. In addition, it is to be understood that the mechanisms employed may take forms different than those shown in FIGS. 1 through 7, that is, the motions and forces indicated may be applied through pneumatic, hydraulic or like means, to produce a similar mode of operation.

As shown in FIG. 8, a punch sleeve 52 is provided with a punch cavity 54 and a relatively movable heading pin 56. The die however, unlike the apparatus of FIGS. 1 through 7, is also provided with a heading pin 58 which is slidable within the sleeve portion 50. The heading pins 56 and 58 in the punch and die respectively, are operative to apply axial compressive forces to a blank or workpiece 60 in the form of a solid cylindrical rod or the like. The pressure P which is sufficient to work the metal is applied when the blank is located in the punch cavity as shown in FIG. 8. The pin 58 is allowed to slip to the position shown in FIG. 9 or some intermediate position and is held in the desired position against the pressure P applied by the pin 56. If the pin 58 is held in an intermediate position, the pin 58 would provide a bore or recess 62 at one end of the finished product as shown in FIGS. 9 and 10. When the metal has substantially filled the punch cavity 54, the sleeve 52 will be allowed to move in a direction counter to the direction of the punch pin 56. As before, the punch cavity 54 into which the metal expands is not completely filled in and a space 64 remains at the concave end of the cavity. As noted above in connection with FIG. 7 the cavity 54 may take any number of geometric shapes and, of course, the pin 58 may be other than the cylindrical shape shown. As shown in FIGS. 9 and 10 the blank having been worked in the confined space of the punch cavity contains sufficient free or unsupported strength, to sustain the force P and the working of the metal blank portion entering the punch cavity.

In the previously described arrangements a solid blank was worked radially outwardly within a cavity, whereas in the modification to be described in connection with FIGS. 11 through 13, a hollow blank is worked radially inwardly. In both instances, the blank, after having been worked, is diminished in length and increased or enlarged in cross-sectional dimension. As shown in FIGS. 11 and 12, a punch cavity 66 now defined by the inner surface of a fixed punch member 68 and a reduced end portion 70 of a work supporting pin 72 allows a hollow blank 74 to expand radially inwardly under pressure. A compressive force P is applied to the hollow blank 74 by a pair of sleeve members, respectively, a punch sleeve 76 and a die sleeve 78. One or both of the sleeves 76 and 78 are axially movable a distance to maintain the pressure P on the blank as it expands into the cavity 66. The sleeve 78 is allowed to slide on a supporting sleeve 80 to the position shown in FIG. 12 and is then held in position against the force P applied to the sleeve 76. As the metal expands radially, the pin 72 slips in a direction opposite to the application of force P by the sleeve 76, thus progressively forming the inside diameter of the article.

As shown in FIG. 13, the end portion 70 of the pin 72 may take any one of a number of forms, which form defines the form of the interior surface of the manufactured article. It is to be understood of course, that the outer peripheral surface of the article may also take any one of a number of desired forms by employing a suitably shaped portion on the interior of the punch member 68, at least at the cavity defining portion thereof.

In the modification shown in FIG. 14, which is similar in some respects to that shown in FIGS. 8, 9 and 10, the die pin is made as a solid member 82, which in its initial position abuts against a sliding sleeve 84 and a metal blank 86. Pressure P is applied, through die pin 82 and a heading pin 87, and the pin 82 is allowed to move a small distance to the right, at which time it is held in position thus causing the sleeve 84 to move to the left under the force of the expanding metal. The forces applied to the various movable elements are adjusted and controlled to allow expansion of the metal to produce the desired article. The expanding metal in this modification, however, is supported thus making it possible to make substantially long articles.

Figure 15:
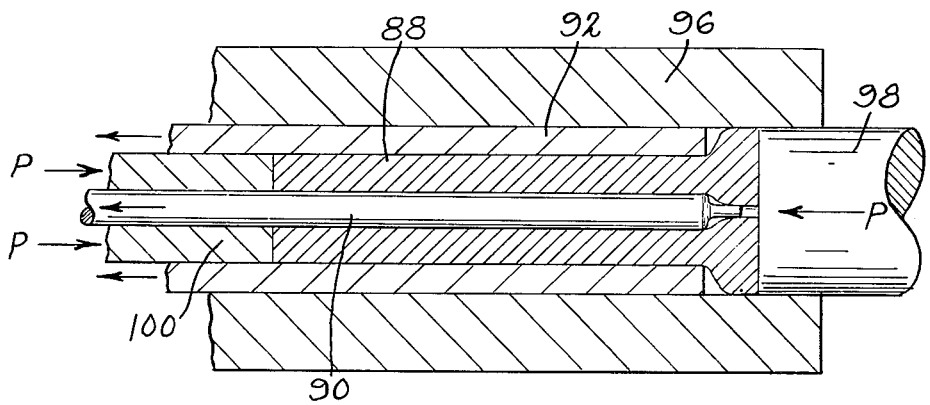
FIG. 15 is a cross-sectional view of still another embodiment of the invention.

In FIG. 15, a tubular blank 88 is allowed to expand radially inwardly and outwardly at the same time. To effect this result, a slidable pin 90, much the same as the pin shown in FIGS. 11 and 12 and a slidable sleeve 92, support a hollow blank 88 within a member 96. Pins 98 and 100 apply a pressure P to the blank and the pin 90 and sleeve 92 are allowed to slide in the direction shown thus producing an article with an increased outer diameter and a decreased inner diameter.

It will thus be seen that the objects set forth above, among those made apparent from the preceding description, are efficiently attained and, since certain changes may be made in carrying out the above process, in the described product, and in the constructions set forth without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for progressively cold working a metal blank comprising first means for engaging one end of the metal blank, second means movable with respect to said first means and engaging the blank to axially compress the blank, and a sleeve slidable with respect to said second means and adapted to receive the blank to confine it against radial expansion over a substantial portion of its length, said first means and said sleeve defining a cavity therebetween into which said blank is expanded under the axial pressure of said second means and means forming a portion of the sleeve for allowing the blank to expand, having at least one internal cavity wall portion substantially parallel to the longitudinal axis of the sleeve to provide a uniform cross-sectional area over substantially the entire expanded portion of the blank.

2. Apparatus for progressively cold working a metal blank comprising first means for engaging one end of the metal blank, second means movable with respect to said first means and engaging the blank to axially compress the blank, and a sleeve having an end portion thereof in contact with said first means and defining a cavity therebetween, said sleeve adapted to receive the blank to confine it against radial expansion over a substantial portion of its length, said sleeve adapted to slide with respect to said second means and said blank in a direction opposite to the direction of movement of said second means as it axially compresses the blank, whereby the blank is expanded into the cavity and the movement of said sleeve elongates the cavity into which the blank may be expanded and said end portion of said sleeve having a sleeve continuation to control the radial expansion and the cross-sectional shape of the expanded blank to provide an expanded blank having a substantially uniform cross-sectional area over substantially the entire length of the expanded blank.

3. The apparatus defined in claim 2 and further including resilient means acting between said sleeve and said second means to urge said sleeve into contact with said first means during initial expansion of the blank.

4. The apparatus defined in claim 3 wherein the force exerted by said resilient means between said sleeve and said second means is sufficient to hold said sleeve in contact with said first means until the blank has been expanded into a substantial portion of the cavity defined between said sleeve and said first means, and thereafter allows said sleeve to slide with relation to the blank and said second means against the force of said resilient means, thereby allowing the blank to be progressively expanded as said sleeve uncovers additional portions of the length of the blank.

5. Apparatus for progressively cold working a metal blank comprising a die having a cavity therein, a punch movable with respect to said die, means to move said punch toward and from said die, a sleeve having an axial bore extending therethrough, said punch being slidably mounted within said bore, and a spring acting between said punch and said sleeve to urge said sleeve into contact with said die during initial expansion only, said sleeve being further provided with an elongated expanded cavity concentric with the axial bore having at least one wall substantially parallel to the longitudinal axis of said sleeve and in mating relationship with the cavity in said die.

6. Apparatus for progressively cold working and expanding the cross-sectional area of a metal blank comprising a sleeve adapted to receive the blank therein, said sleeve including a first cavity, a second cavity of a greater cross-sectional area than said first cavity, and a shoulder separating said first and second cavities, said second cavity having at least one internal wall substantially parallel to the longitudinal axis of the sleeve, a first member for engaging one end of the blank and a second member slidably mounted within the first cavity of the sleeve for applying a force to axially compress the blank against said first member in order to expand said blank within said second cavity and against said shoulder to move said sleeve in an opposite direction to the direction of motion of said second member while at the same time providing an expanded blank having a substantially uniform cross-sectional area over substantially its entire length.

7. Apparatus for progressively cold working a metal blank comprising a first means adapted to receive the blank therein, a second means for applying an axial force to one end of the blank while said blank is in said first means, and a member for applying an oppositely directed axial force to the other end of the blank, said first means cooperating with said second means to define a cavity into which said blank is progressively expanded, and at least one of said means having at least one wall portion extending substantially parallel to the longitudinal axis of said first means to provide a substantially uniform cross-sectional area over substantially the entire length of the expanded blank.

References Cited by the Examiner

UNITED STATES PATENTS

| Re. 14,384 | 10/17 | Ferry | 10—26 |
|---|---|---|---|
| 126,495 | 5/72 | Seward | 78—17 |
| 760,220 | 5/04 | Loss | 78—17 |
| 1,352,911 | 9/20 | Paque | 78—18 |
| 1,618,445 | 2/27 | Kuhne | 10—24 |
| 1,766,484 | 6/30 | Clouse | 78—18 |
| 1,819,254 | 8/31 | Mantle | 10—27.1 |
| 1,837,097 | 12/31 | Birth | 78—63 |
| 2,165,424 | 7/39 | Tomalis | 10—24 |
| 2,733,503 | 2/56 | Beringer et al. | 29—553 |
| 2,755,546 | 7/56 | Moore | 29—553 |
| 2,932,889 | 4/60 | Kritcher | 78—63 |

FOREIGN PATENTS

| 137,600 | 6/50 | Australia. |
|---|---|---|
| 867,637 | 2/49 | Germany. |
| 703,757 | 2/54 | Great Britain. |
| 294,775 | 2/54 | Switzerland. |

WILLIAM J. STEPHENSON, *Primary Examiner.*

WHITMORE A. WILTZ, WILLIAM W. DYER, JR., CHARLES W. LANHAM, *Examiners.*